United States Patent
Stout et al.

(10) Patent No.: US 8,439,540 B2
(45) Date of Patent: May 14, 2013

(54) AIRCRAFT POSITION LIGHT ASSEMBLY

(75) Inventors: Bo Stout, Springfield, OH (US); Timothy A. Holden, Plain City, OH (US); Kenneth Colvin, Springfield, OH (US); Richard Walker, Urbana, OH (US); John Lundberg, Springfield, OH (US)

(73) Assignee: Honeywell International Inc., Morristown, NJ (US)

( * ) Notice: Subject to any disclaimer, the term of this patent is extended or adjusted under 35 U.S.C. 154(b) by 324 days.

(21) Appl. No.: 12/793,588

(22) Filed: Jun. 3, 2010

(65) Prior Publication Data

US 2011/0299293 A1   Dec. 8, 2011

(51) Int. Cl.
*B60Q 1/26* (2006.01)

(52) U.S. Cl.
USPC ........... 362/540; 362/549; 362/545; 362/470; 362/432

(58) Field of Classification Search ................. 362/540, 362/549, 517, 543–545, 432, 646, 647, 652, 362/470, 471
See application file for complete search history.

(56) References Cited

U.S. PATENT DOCUMENTS

| 6,244,728 | B1 | 6/2001 | Cote et al. |
| 6,296,378 | B1 | 10/2001 | Doyen |
| 6,507,290 | B1 | 1/2003 | Lodhi et al. |
| 6,886,963 | B2 * | 5/2005 | Lodhie .......................... 362/235 |
| 2005/0201112 | A1 * | 9/2005 | Machi et al. .................. 362/470 |
| 2007/0171665 | A1 * | 7/2007 | Finch ............................ 362/516 |

* cited by examiner

*Primary Examiner* — Jong-Suk (James) Lee
*Assistant Examiner* — Leah S Macchiarolo
(74) *Attorney, Agent, or Firm* — Lowe Graham Jones PLLC (57) ABSTRACT

An aircraft position light assembly having one or more light emitting diode (LED) modules. The LED module can be installed in a variety of aircraft wing-tip cavities. An example LED module includes a support device that mounts within an aircraft wingtip, a bracket device that attaches to the support device, at least one circuit board that mounts to the bracket, and two pairs of LEDs. Each pair of LEDs is mounted on opposing major surfaces at a first end of the circuit board. A first pair of reflectors is attached to the circuit board adjacent to two of the LEDs on the opposing major surfaces. A second pair of reflectors is attached to the circuit board adjacent to the other two LEDs on the opposing major surfaces.

17 Claims, 8 Drawing Sheets

AIRCRAFT POSITION LIGHT ASSEMBLY

BACKGROUND OF THE INVENTION

Many large, commercial aircraft navigation lights use incandescent or halogen light modules. These light modules are unpredictable when they fail. Thus, it can be expensive to have to replace these light modules at the time of failure, instead of at a preknown time for scheduling of such maintenance. Light-emitting-diodes (LEDs) are slowly replacing navigation and position lights on commercial aircraft. Some of the benefits include longer life, lower power, lighter module packages, etc. However, many of the existing LED systems are not designed to fit into existing light module housings, thereby making replacement of incandescent or halogen lamps with LEDs an expensive and time-consuming process.

SUMMARY OF THE INVENTION

Miniaturized forward position light universal module—LED—Meet FAA photometric requirements of aircraft forward position light using a universal, compact, LED module that can be installed in a variety of aircraft wing-tip cavities. Utilize a "blade" form factor to optimize space usage while maximizing photometric performance at historically weak areas of the FAA required angular intensity pattern.

The arrangement of the LEDs, reflectors, and light baffling surfaces allow for the smallest possible physical footprint and best possible performance at 90-degree vertical angular intensity points from an LED light module. Indirect-view reflector orientations maximize reflector light collection and redirection into critical portions of the angular intensity pattern while allowing direct-LED view to the wide-angle intensity zones (110-degrees horizontal and 90-degrees vertical).

BRIEF DESCRIPTION OF THE DRAWINGS

Preferred and alternative embodiments of the present invention are described in detail below with reference to the following drawings:

FIG. 4-1 illustrates a perspective view of an LED module;

FIG. 4-2 illustrates a top view of the LED module of FIG. 4-1;

FIG. 4-3 illustrates an exploded view of the LED module of FIG. 4-1;

FIG. 8-1 illustrates a perspective view of an LED module formed in accordance with an alternate embodiment of the present invention;

FIG. 8-2 illustrates a bottom view of the LED module shown in FIG. 8-1; and

FIG. 8-3 illustrates an exploded view of the LED module shown in FIG. 8-1.

DETAILED DESCRIPTION OF THE INVENTION

Figure 1:
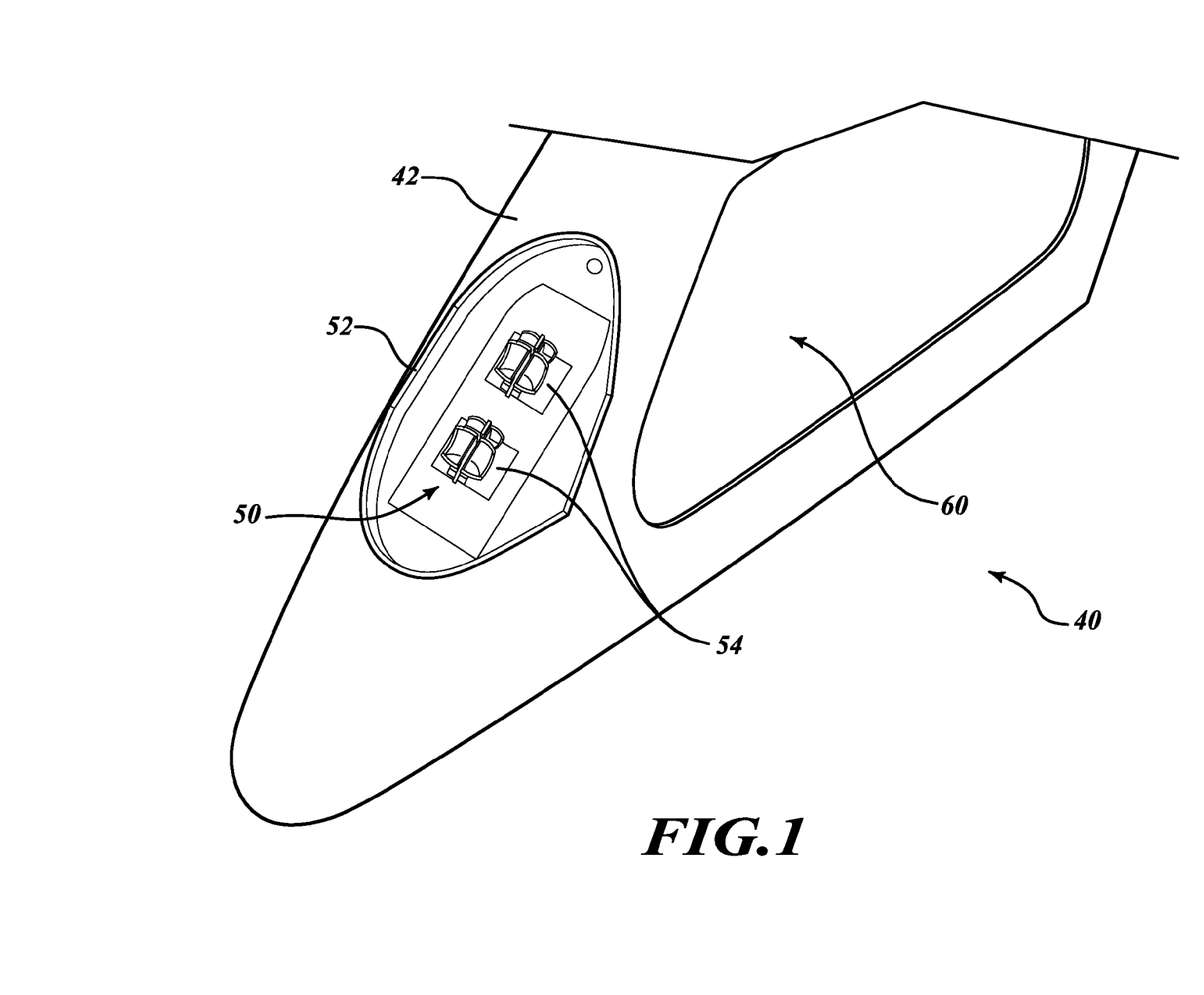
FIG. 1 illustrates a partial perspective view of a wingtip assembly that includes twp light-emitting diode (LED) module formed in accordance with the present invention.
Figure 2:
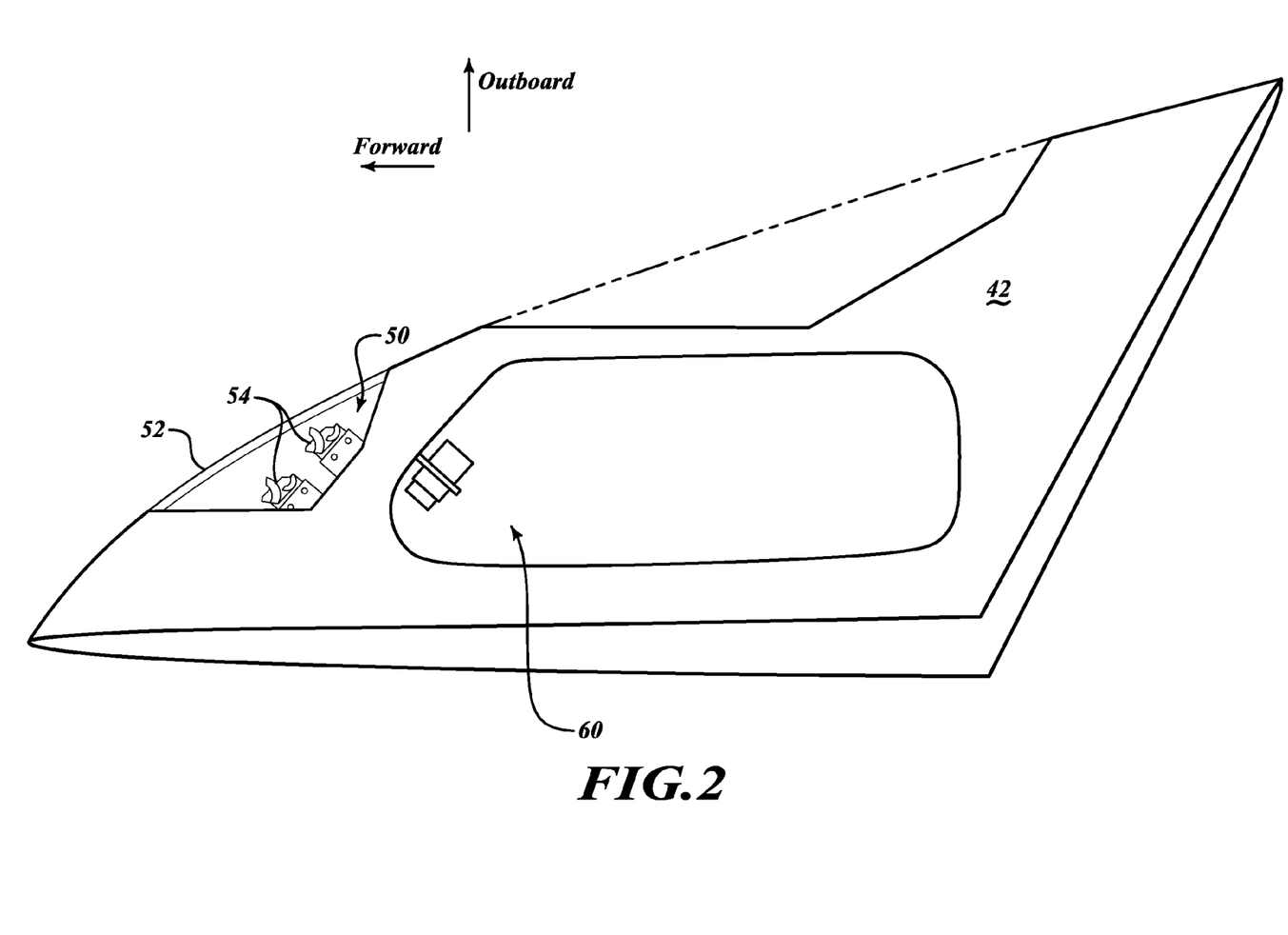
FIG. 2 illustrates a side view of the wingtip assembly of FIG. 1.
Figure 3:
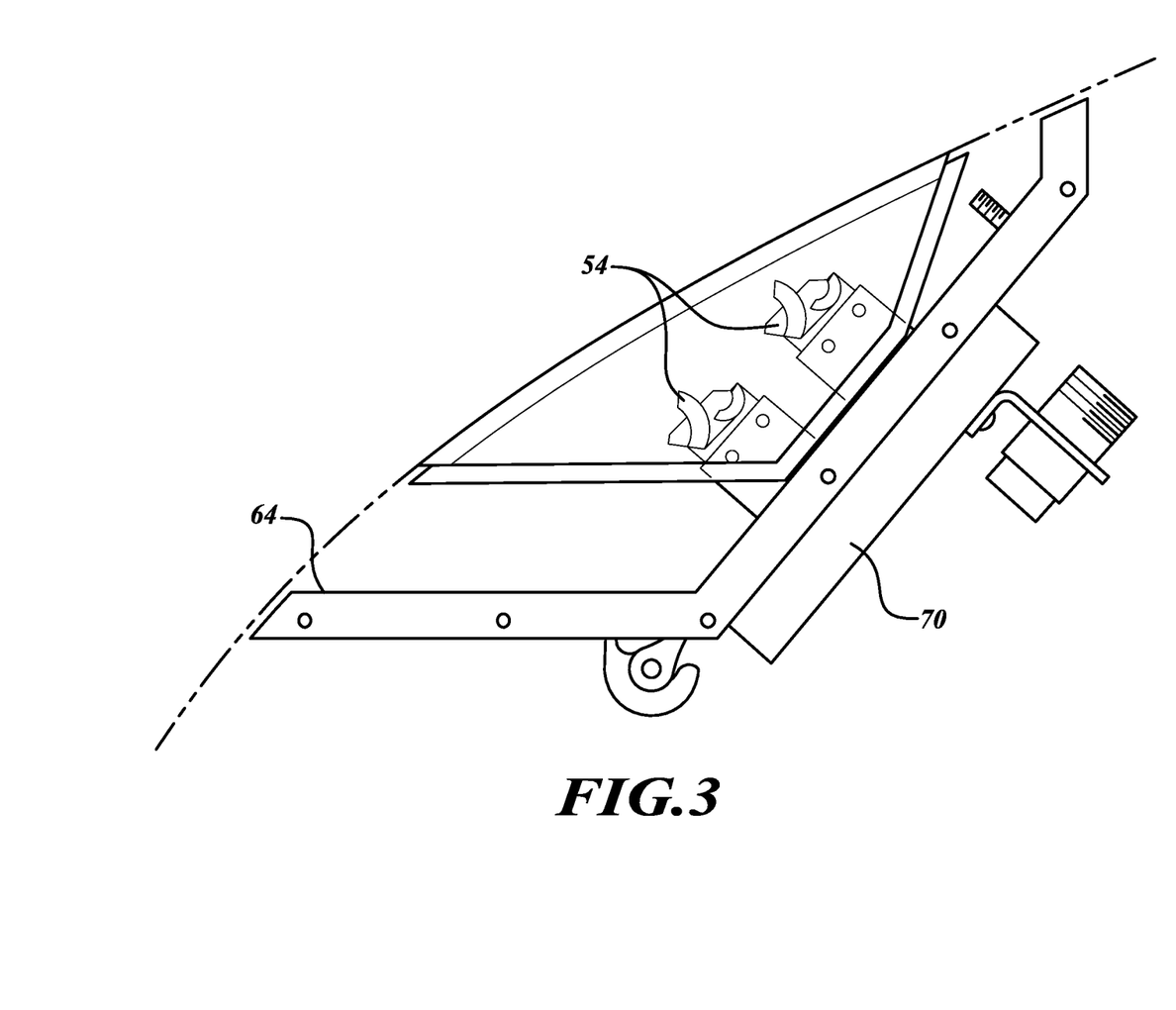
FIG. 3 illustrates a side view of an LED wingtip assembly used in FIGS. 1 and 2.

As shown in FIGS. 1-3, a wingtip assembly 40 includes a wing surface 42 with a cavity for housing position lights 50. The wingtip assembly 40 also includes an access panel 60. The position lights 50 are covered by a lens 52. The position lights 50 include two light-emitting diode (LED) modules 54. The LED modules 54 are mounted on a support base 70 that is rotatably attached to a support bracket 64 (see FIGS. 5-7).

Figure 41:
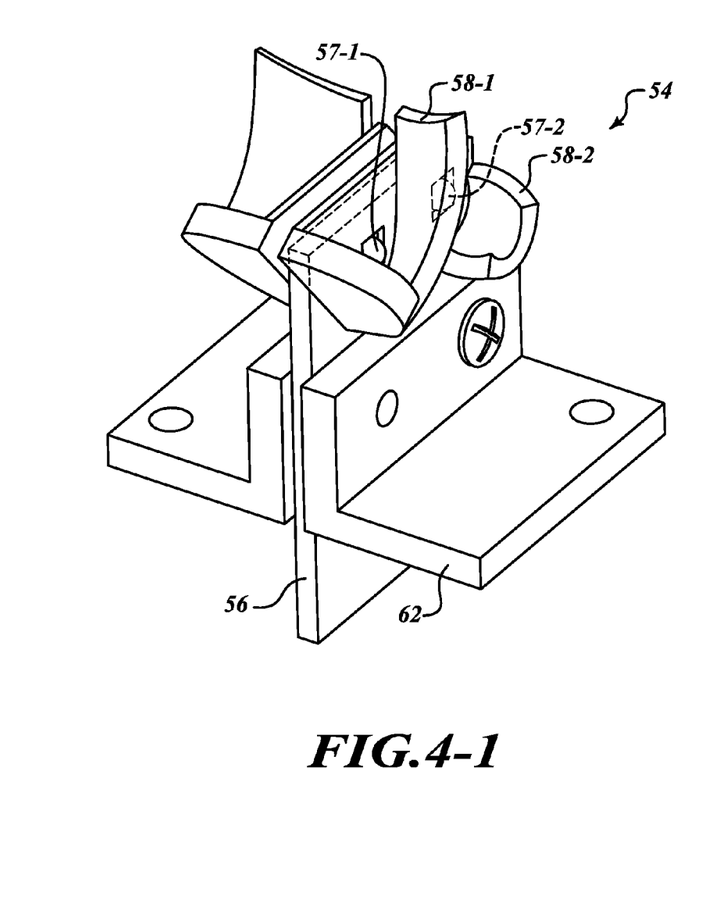
Figure 42:
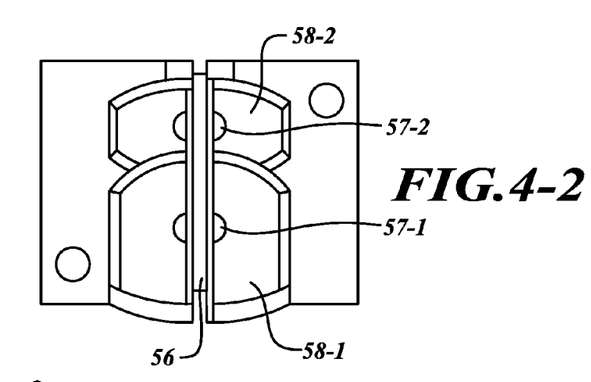
Figure 43:
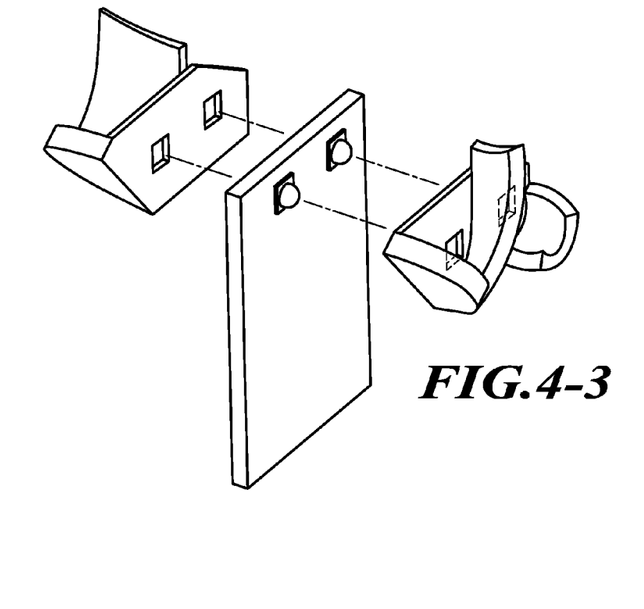

FIGS. 4-1, 4-2, 4-3 illustrate an exemplary LED module 54. The LED module 54 includes a circuit board 56 that includes two major surfaces. Each of the major surfaces includes metallic traces (not shown). Two or more metallic traces (not shown) are embedded within the circuit board 56. A single circuit board design may also be used.

A first reflector unit (forward 58-1 and aft 58-2) is mounted on the circuit board 56 at a first end. A second reflector unit is mounted on the circuit board 56 on the side of the circuit board 56 opposite the first reflector unit. In one embodiment, the reflector units are a molded plastic structures that include a metalized (or other reflective) interior for allowing reflection of light produced by LEDs 57-1, 57-2. The LEDs 57-1, 57-2 (on both sides of the circuit board 56) mount to the circuit board 56 through the respective reflector unit. In one embodiment, the forward and aft reflectors 58-1 and 58-2 are formed as a single piece and may be mounted to the circuit board 56 by any of a number of methods, such as rivets, screws, epoxy, etc. The reflectors 58-1, 58-2 are shaped and positioned on the circuit board 56 in order to provide a desired deflection pattern of the light produced by the LEDs 57-1, 57-2.

In one embodiment, the metalized surface on the reflector units is applied using a vacuum metallization process. A clear topcoat is applied for protecting the metalized surface.

In one embodiment, the LEDs 57-1, 57-2 include three metallic pads. One of the pads is a heat sink pad and the other two electrically connect the LED to a remote power source. Example manufacturers of the LEDs 57-1 and 57-2 include, but are not limited to, Cree, Philips, Osram, Nichia and Sharp. The LEDs 57-1 and 57-2 are surface mounted to the circuit board 56 such that the heat sink pads of the LEDs 57-1 and 57-2 attach to respective surface-mounted electrical metallic traces. The other two pads of the LEDs 57-1 and 57-2 connect to metallic vias that pass through the circuit board 56 to connect to the internally embedded electrically isolated metallic traces.

The LED module 54 also includes two L-shaped brackets 62 that attach at approximately a center position of the circuit board 56 along a longitudinal axis. In one embodiment, screws are used to attach the L-shaped bracket 62 to the circuit board 56. Other fastening means may be used. The L-shaped brackets 62 are preferably a metal material, such as aluminum, and are positioned so that they come in contact with the heat sink surface traces on the surface of the circuit board 56. Flanges (bottom of the L) perpendicular to the portion of the L-shaped brackets 62 attached to the circuit board 56 include holes that allow the L-shaped brackets 62 to be attached to the support base 70 using fastening devices. The L-shaped brackets 62 may be a single piece with a slot for receiving the circuit board 56.

The LED circuit board 56 includes a second end that extends below the L-shaped brackets 62 opposite where the LEDs are mounted. The second end of the circuit board 56, in one embodiment, includes attachment devices for allowing connection to wires that are coupled to a power source (not shown). Also, in one embodiment, the second end of the circuit board 56 includes circuit components (not shown) for performing various operations relative to the LEDs 57-1 and 57-2. For example, the electronic components may include a timer(s), a temperature sensor, a near-end-of-life indicator LED, power control circuitry, LED bypass device(s) (e.g., SCR, diodes) and/or other circuit components.

Figure 5:
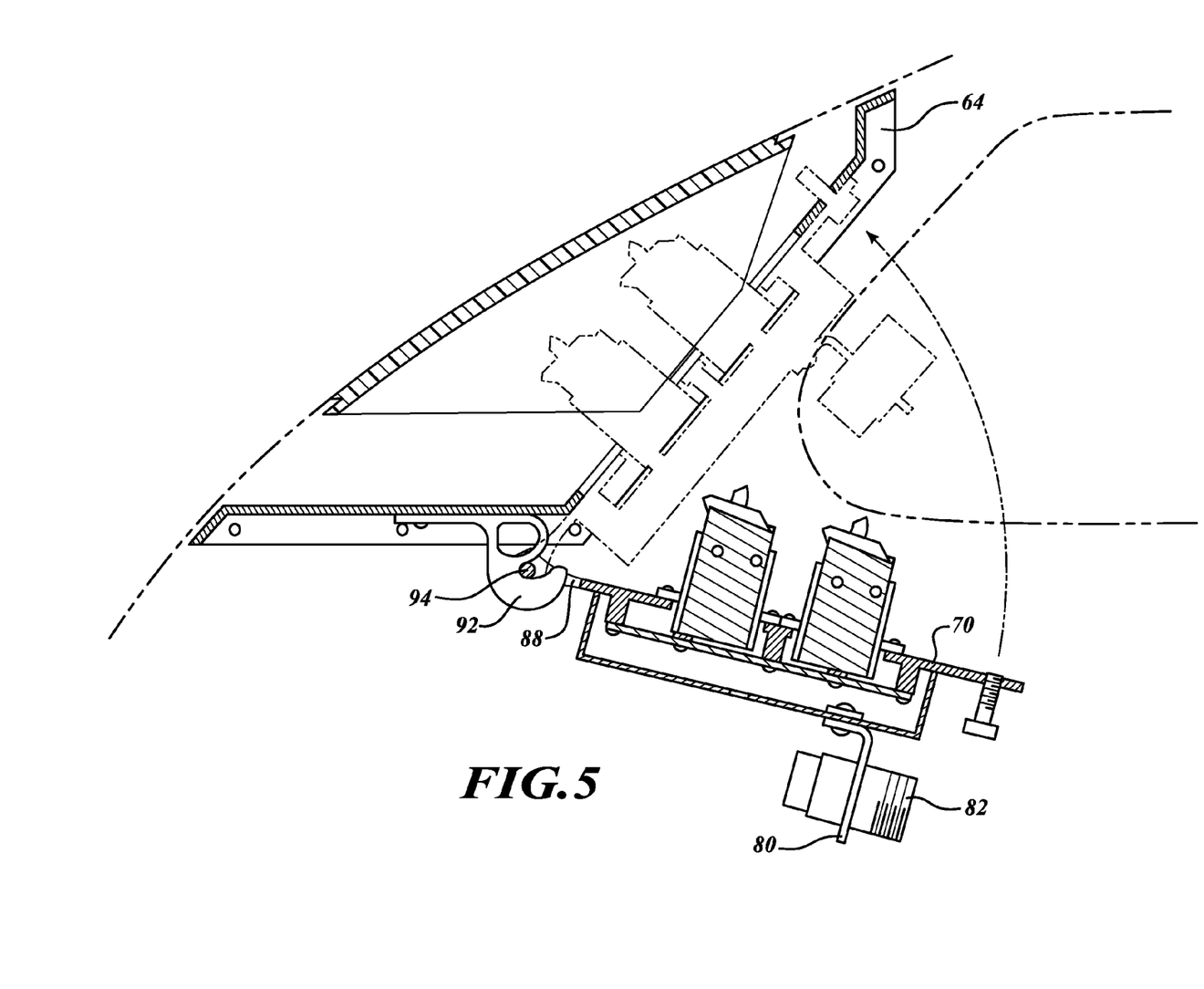
FIG. 5 illustrates a side view of a frame with the support bracket of FIG. 3 in an open and closed position.
Figure 6:
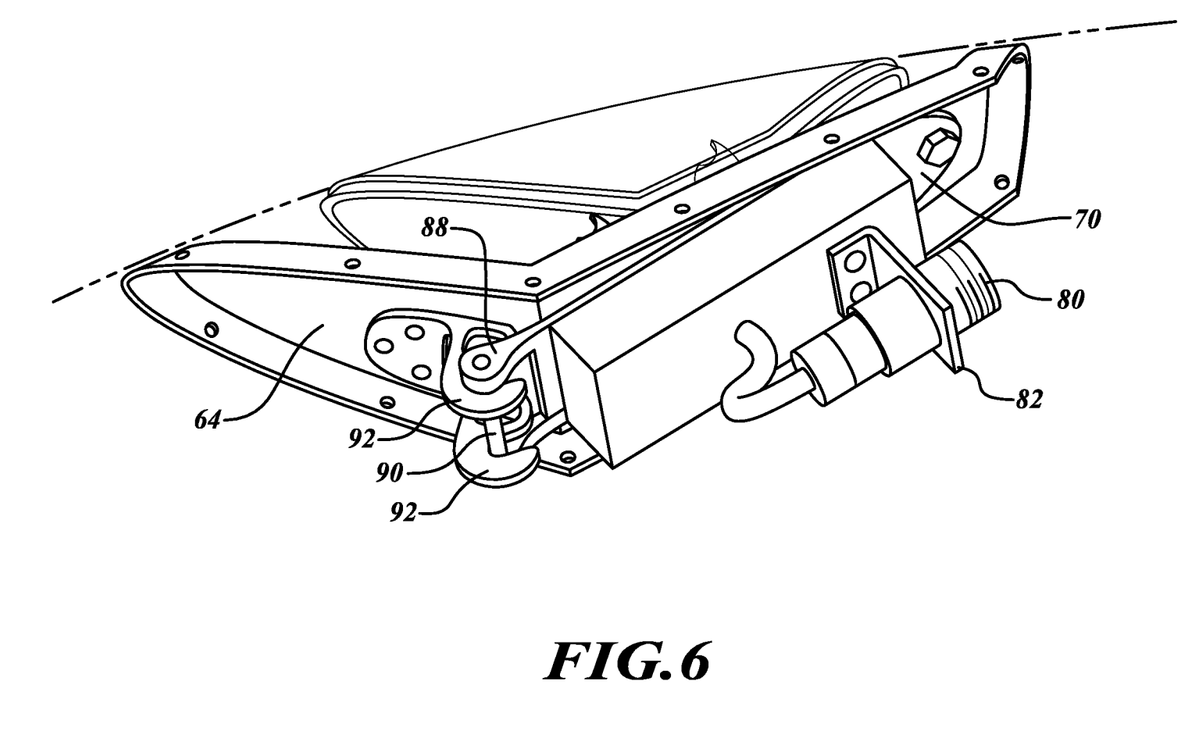
FIG. 6 illustrates a perspective rear view of the frame and the support bracket of FIG. 5 in an open position.
Figure 7:
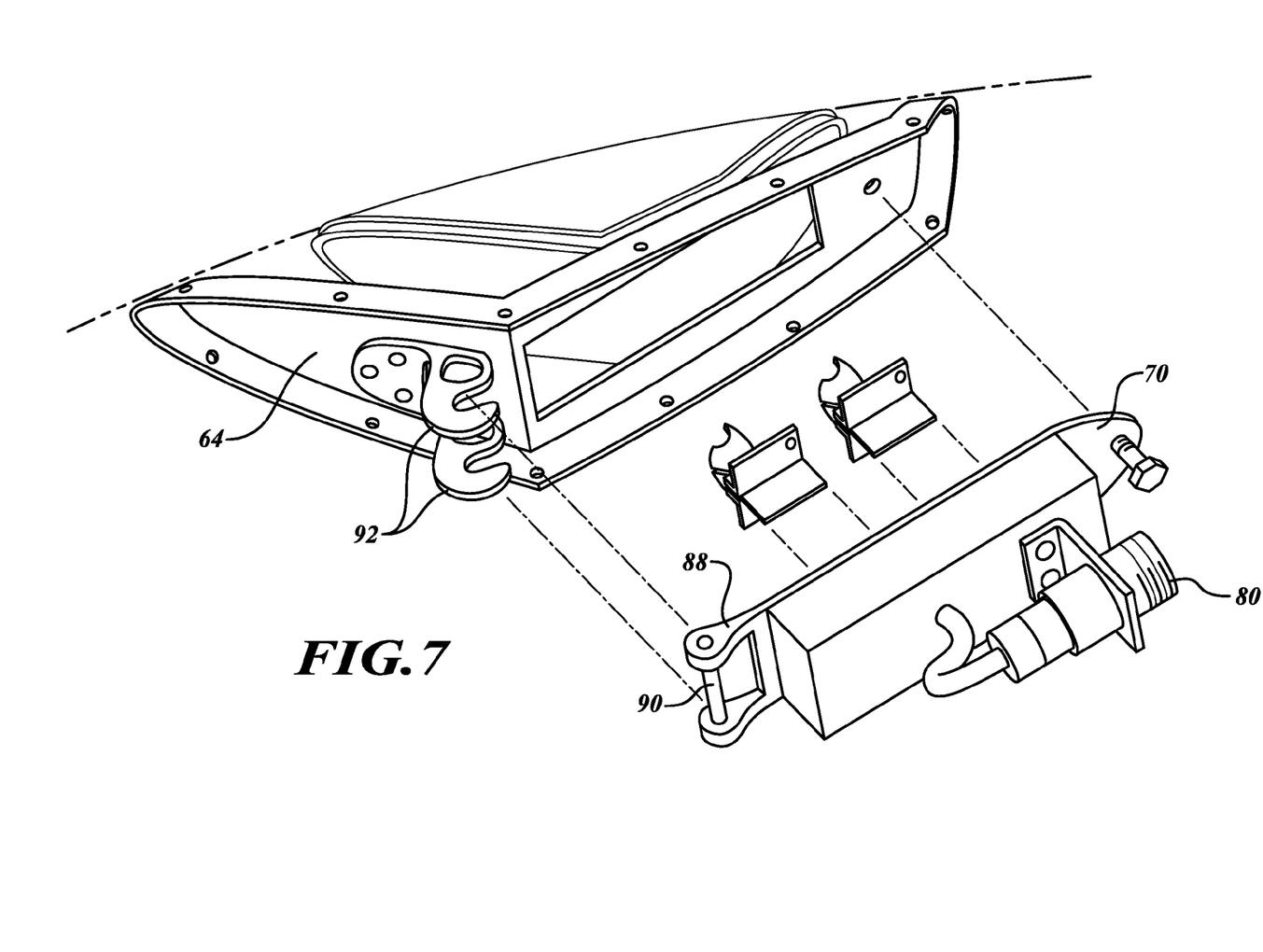
FIG. 7 illustrates a view of the support bracket separated from the frame.

FIGS. 5-7 illustrate functionally operational positions for the components of the position lights 50 in accordance with one embodiment. The support base 70 is rotatably mounted to the support bracket 64 at support hooks 92 via a rod 90 that is connected to arms 88 that extend from a forward end of the support base 70. In order to perform maintenance of the position lights 50, one accesses the access panel 60 and releases a securing bolt that connects the support base 70 to the support bracket 64 then rotates the support base 70 away from the support bracket 64. Then the support base 70 can be easily disconnected from the support bracket 64 for repair or replacement, see FIG. 7. Other manufacturers require that the bulbs be accessible and replaceable by removing the outer lens and outer lens retainer.

Figure 81:
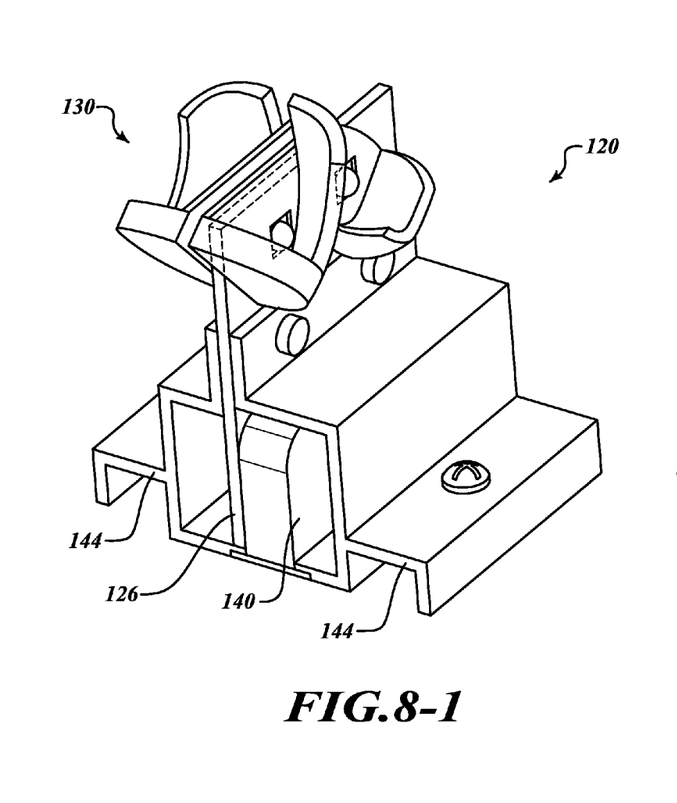
Figure 82:
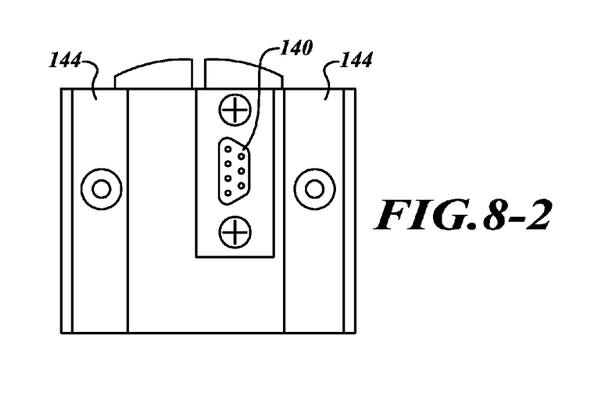
Figure 83:
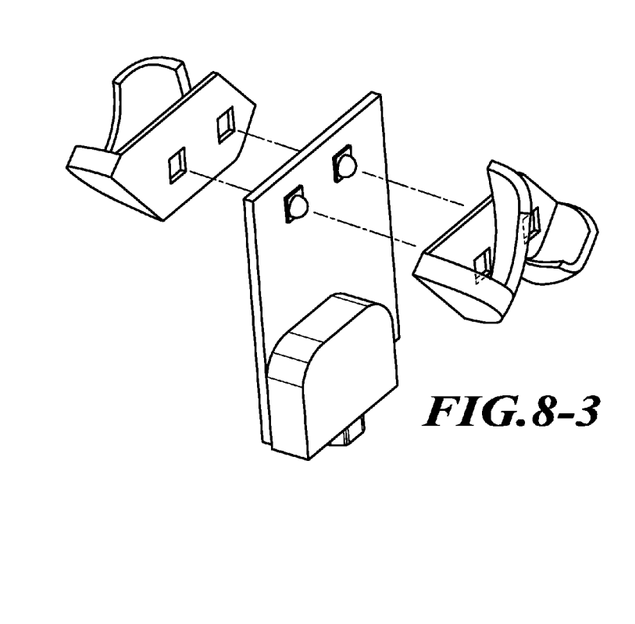

FIGS. 8-1, 8-2, 8-3 illustrate a light module 120 that includes a circuit board 126 having LEDs and reflectors 130 attached at a first end similar to the LED modules 54 described above. Various electronic components and/or electrical connector 140 are mounted at an end of the circuit board 126 opposite where the LEDs and reflectors 130 are mounted. One or more bracket devices 144 attach to the circuit board 126 between the LEDs/reflectors 130 and the electronic components and/or the electrical connector 140. The one or more bracket devices 144 connect the circuit board 126 to the support base 70 and provide a heat sink for surface mounted heat sink traces. The wire port 140 includes a plug for receiving power and outputting signals produced by the electronic components. The electronic components may include a timer, a temperature sensor, power control circuitry, and/or other devices.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. An aircraft light module configured to mount within an existing socket, the aircraft light module comprising:
   a circuit board;
   a first reflector attached to the circuit board on a first major surface;
   a second reflector attached to the circuit board on a second major surface opposing the first major surface;
   at least one first light emitting diode (LED) mounted through the first reflector on the first major surface at a first end of the circuit board;
   at least one second LED mounted through the second reflector on the second major surface at the first end of the circuit board; and
   at least one bracket device,
   wherein the circuit board comprises two or more electrical traces embedded within the circuit board and at least four vias for electrically attaching corresponding leads of the LEDs to the embedded traces,
   wherein the at least one circuit board is attached to the at least one bracket device,
   wherein the circuit board extends to a first side of the bracket device opposite a second side where the LEDs and reflectors are mounted.

2. The module of claim 1, wherein the circuit board comprises a metalized heat sink trace on each of the major surfaces.

3. The module of claim 2, wherein the at least one bracket device is formed of a heat conductive metal that comes in contact with at least one of the heat sink traces.

4. The module of claim 1, wherein the reflectors are configured to provide approximately a 110 degree range of reflected light from the LEDs in a first direction and approximately a 180 degree range of reflected light from the LEDs in a second direction.

5. The module of claim 4, wherein the reflectors are molded plastic having at least one of a metalized reflective surface, an uncoated white plastic material, a chrome plated surface, or a painted surface.

6. The module of claim 5, wherein the metalized surfaces of the reflectors are covered with a protective coating.

7. The module of claim 1, wherein the circuit board comprises two vias per LED.

8. The module of claim 1, wherein the at least one bracket device is L-shaped.

9. The module of claim 8, wherein the circuit board is attached to the at least one bracket device at an approximate longitudinal center.

10. The module of claim 1, wherein the at least one circuit board is configured to receive at least two wires and electrically connect them to the embedded electrical traces.

11. The module of claim 1, wherein the circuit board comprises a double-sided, metal core, single layer circuit board.

12. The module of claim 1, wherein a normal of the major surfaces is approximately parallel to a plane of a mounting surface of the bracket device.

13. The module of claim 1, wherein the LED module is a navigation light module.

14. The module of claim 13, wherein the two pairs of LEDs are at least one of red or green.

15. The module of claim 1, further comprising one or more electronic components attached to the circuit board.

16. The module of claim 1, wherein each of the reflectors comprise a first and second reflector shell, the reflector shells surround a respective LED.

17. An aircraft lighting system comprising:
   a support device configured to mount within a wingtip of an aircraft;
   at least one bracket device configured to attach to the support device;
   at least one circuit board configured to mount to the bracket device;
   two pairs of LEDs, each pair mounted on opposing major surfaces at a first end of the at least one circuit board;
   a first reflector attached to the circuit board configured to reflect light from LEDs on a first one of the major surfaces; and
   a second reflector attached to the circuit board configured to reflect light from the other LEDs on a second one of the major surfaces
   wherein the at least one circuit board comprises two or more electrical traces embedded within the circuit board and at least four vias for electrically attaching corresponding leads of the LEDs to the embedded traces, wherein the circuit board extends to a first side of the bracket device opposite a second side where the LEDs and reflectors are mounted.

* * * * *